(12) United States Patent
Kanno et al.

(10) Patent No.: US 10,871,434 B2
(45) Date of Patent: Dec. 22, 2020

(54) PARTICULATE DETECTOR

(71) Applicant: NGK INSULATORS, LTD., Nagoya (JP)

(72) Inventors: Keiichi Kanno, Nagoya (JP);
Hidemasa Okumura, Nagoya (JP);
Kazuyuki Mizuno, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 141 days.

(21) Appl. No.: 16/267,879

(22) Filed: Feb. 5, 2019

(65) Prior Publication Data
US 2019/0242806 A1    Aug. 8, 2019

(30) Foreign Application Priority Data

Feb. 8, 2018   (JP) .................................. 2018-021334

(51) Int. Cl.
*G01N 15/00* (2006.01)
*G01N 15/06* (2006.01)

(52) U.S. Cl.
CPC ..... *G01N 15/0656* (2013.01); *G01N 15/0606* (2013.01); *G01N 2015/0046* (2013.01)

(58) Field of Classification Search
CPC ........... G01N 15/0656; G01N 15/0606; G01N 2015/0046
See application file for complete search history.

(56) References Cited

U.S. PATENT DOCUMENTS

2012/0234172 A1 *   9/2012   Sugiyama .......... G01N 15/0656
                                                              96/26
2017/0010202 A1 *   1/2017   Mizuno ..................... B03C 3/47

FOREIGN PATENT DOCUMENTS

JP          2016-161369 A1     9/2016

* cited by examiner

*Primary Examiner* — Jamel E Williams
(74) *Attorney, Agent, or Firm* — Burr & Brown, PLLC

(57) ABSTRACT

A particulate detector that is used to detect a particulate in gas, the particulate detector includes an electric-charge generator that applies an electric charge generated by electric discharge to the particulate in the gas that is introduced into a gas flow path to obtain a charged particulate and a first collector that collects an excess electric charge that is not applied to the particulate and a second collector that collects the charged particulate and a detection unit that corrects a second physical quantity that varies in response to the charged particulate collected by the second collector on the basis of a first physical quantity that varies in response to the excess electric charge collected by the first collector and that detects an amount of the particulate on the basis of the corrected second physical quantity.

9 Claims, 7 Drawing Sheets

PARTICULATE DETECTOR

BACKGROUND OF THE INVENTION

1. Field of the Invention

The present invention relates to a particulate detector.

2. Description of the Related Art

A known particulate detector determines the amount of particulates on the basis of a measurement signal correlated to the amount of the particulates in exhaust gas of an internal combustion engine. For example, according to PTL 1 related to this kind of particulate detector, the problem is that the insulation properties of an insulating member used in the particulate detector deteriorate over time, and that this results in leakage current, which decreases measurement accuracy, and zero correction of the measurement signal is made when a fuel cut signal is received from a vehicle controller.

CITATION LIST

Patent Literature

PTL 1: Japanese Unexamined Patent Application Publication No. 2016-161369

SUMMARY OF THE INVENTION

According to PTL 1, however, it is necessary for the particulate detector to be connected to a signal line for receiving the fuel cut signal from the vehicle controller.

The present invention has been accomplished to solve the above problem, and a primary object of the present invention is to correct the amount of particulates without using a signal from the outside of the particulate detector.

According to the present invention, the following measure is taken to achieve the above primary object.

A particulate detector according to the present invention is a particulate detector that is used to detect a particulate in gas. The particulate detector includes a housing having a gas flow path through which the gas passes, an electric-charge generator that applies an electric charge generated by electric discharge to the particulate in the gas that is introduced into the gas flow path to obtain a charged particulate, a first collector that is disposed on the gas flow path downstream of the electric-charge generator in a direction of flow of the gas and that collects an excess electric charge that is not applied to the particulate, a second collector that is disposed on the gas flow path downstream of the first collector in the direction of the flow of the gas and that collects the charged particulate, and a detection unit that corrects a second physical quantity that varies in response to the charged particulate collected by the second collector on the basis of a first physical quantity that varies in response to the excess electric charge collected by the first collector and that detects an amount of the particulate on the basis of the corrected second physical quantity.

In the particulate detector, the electric-charge generator generates the electric charge, and consequently, the particulate in gas that is introduced into the gas flow path becomes the charged particulate. The first collector collects the excess electric charge that is not applied to the particulate. The second collector collects the charged particulate. The detection unit corrects the second physical quantity that varies in response to the charged particulate that is collected by the second collector on the basis of the first physical quantity that varies in response to the excess electric charge that is collected by the first collector and detects the amount of the particulate on the basis of the corrected second physical quantity. Consequently, the particulate detector can correct the amount of the particulate without using a signal from the outside of the particulate detector.

In the description, the "electric charge" includes an ion in addition to a positive electric charge and a negative electric charge. The "physical quantity" may be a parameter that varies depending on an object to be collected, and an example thereof includes an electric current. Examples of the "amount of the particulate" include the number, mass, surface area of the particulate.

In the particulate detector according to the present invention, the detection unit may determine whether the first physical quantity varies before and after the electric-charge generator generates the electric charge and may make zero correction of the second physical quantity at this time if the first physical quantity does not vary. From the fact that the first physical quantity does not vary before and after the electric charge is generated, it can be presumed that a flow rate is substantially zero. Accordingly, the zero correction of the second physical quantity can be made while the flow rate is substantially zero.

In this case, when the detection unit determines whether the first physical quantity varies before and after the electric-charge generator generates the electric charge, the detection unit may compare the first physical quantity right before the electric-charge generator generates the electric charge with the first physical quantity within a period until the electric charge reaches the first collector after the electric-charge generator generates the electric charge when a flow rate of the gas is zero. The period is obtained in advance. In this way, the zero correction of the second physical quantity can be made with more proper timing.

In the particulate detector according to the present invention, the detection unit may obtain a charge number per particulate on the basis of the first physical quantity, may correct the second physical quantity by using the charge number, and may detect the amount of the particulate on the basis of the corrected second physical quantity. When the amount of the particulate is calculated on the basis of the second physical quantity, the charge number per particulate needs to be considered. There is a correlation between the amount of the excess electric charge and the charge number per particulate. For this reason, the charge number per particulate is obtained on the basis of the first physical quantity that corresponds to the amount of the excess electric charge, the second physical quantity is corrected by using the charge number, and the amount of the particulate is detected on the basis of the corrected second physical quantity. In this way, the amount of the particulate can be obtained with more precision. The correction is preferably made after the above zero correction of the second physical quantity is made.

In this case, when the detection unit obtains the charge number per particulate on the basis of the first physical quantity, the detection unit may obtain the charge number per particulate in relation to the first physical quantity by using a relationship between the first physical quantity and the charge number per particulate. The relationship is stored in advance in a memory unit. In this way, the charge number per particulate related to the first physical quantity can be easily obtained.

DETAILED DESCRIPTION OF THE INVENTION

Figure 1:
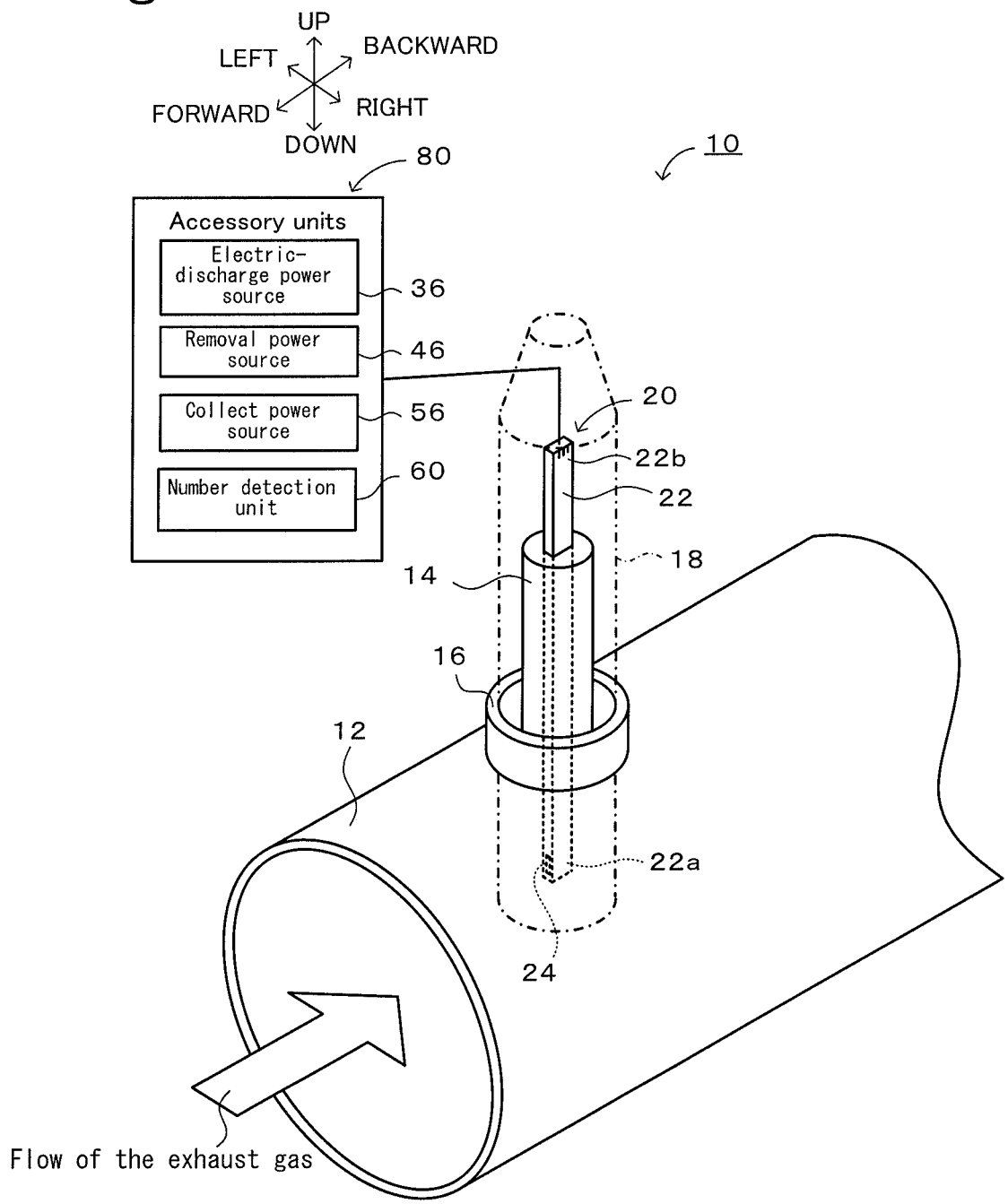
FIG. 1 illustrates a particulate detector 10.
Figure 2:
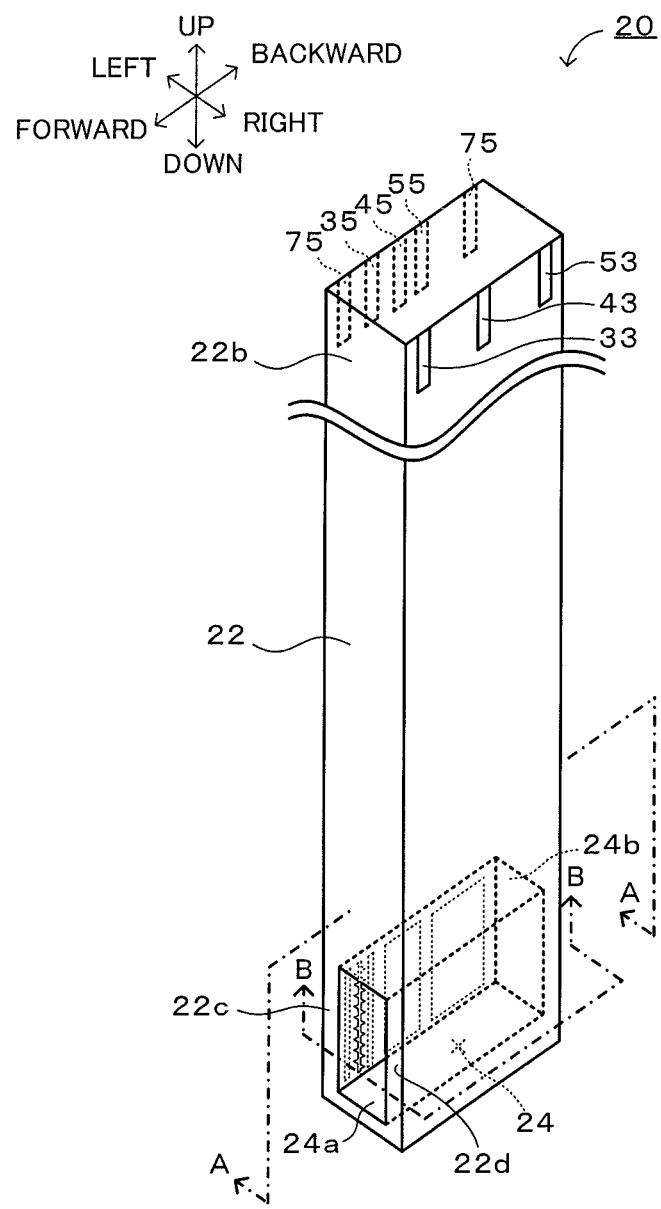
FIG. 2 is a perspective view of a particulate detecting element 20.
Figure 3:
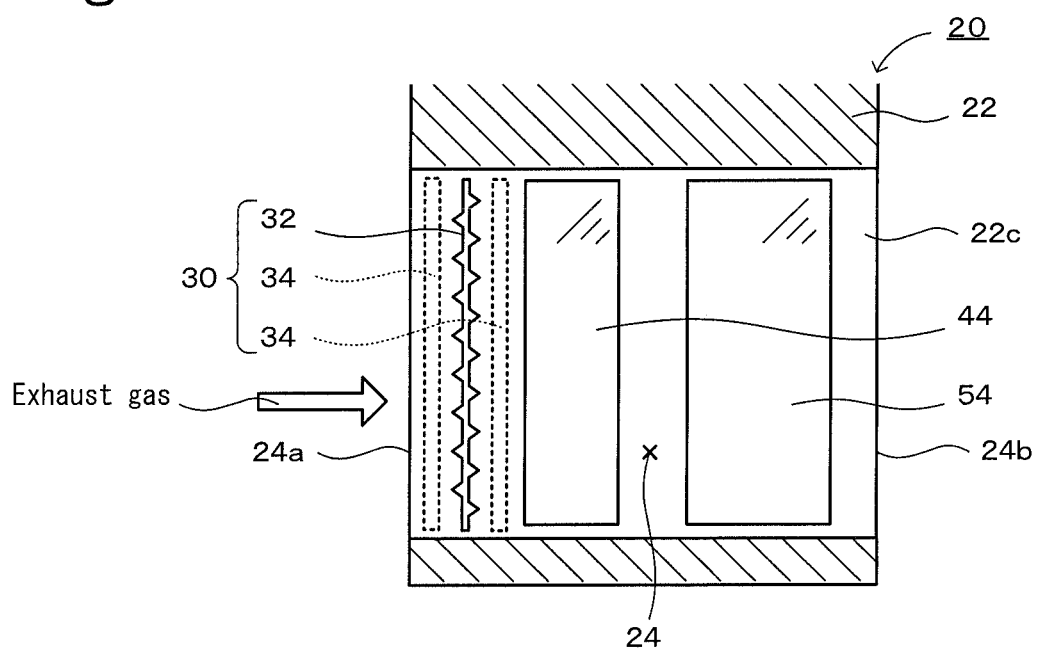
FIG. 3 is a sectional view of FIG. 2 taken along line A-A.
Figure 4:
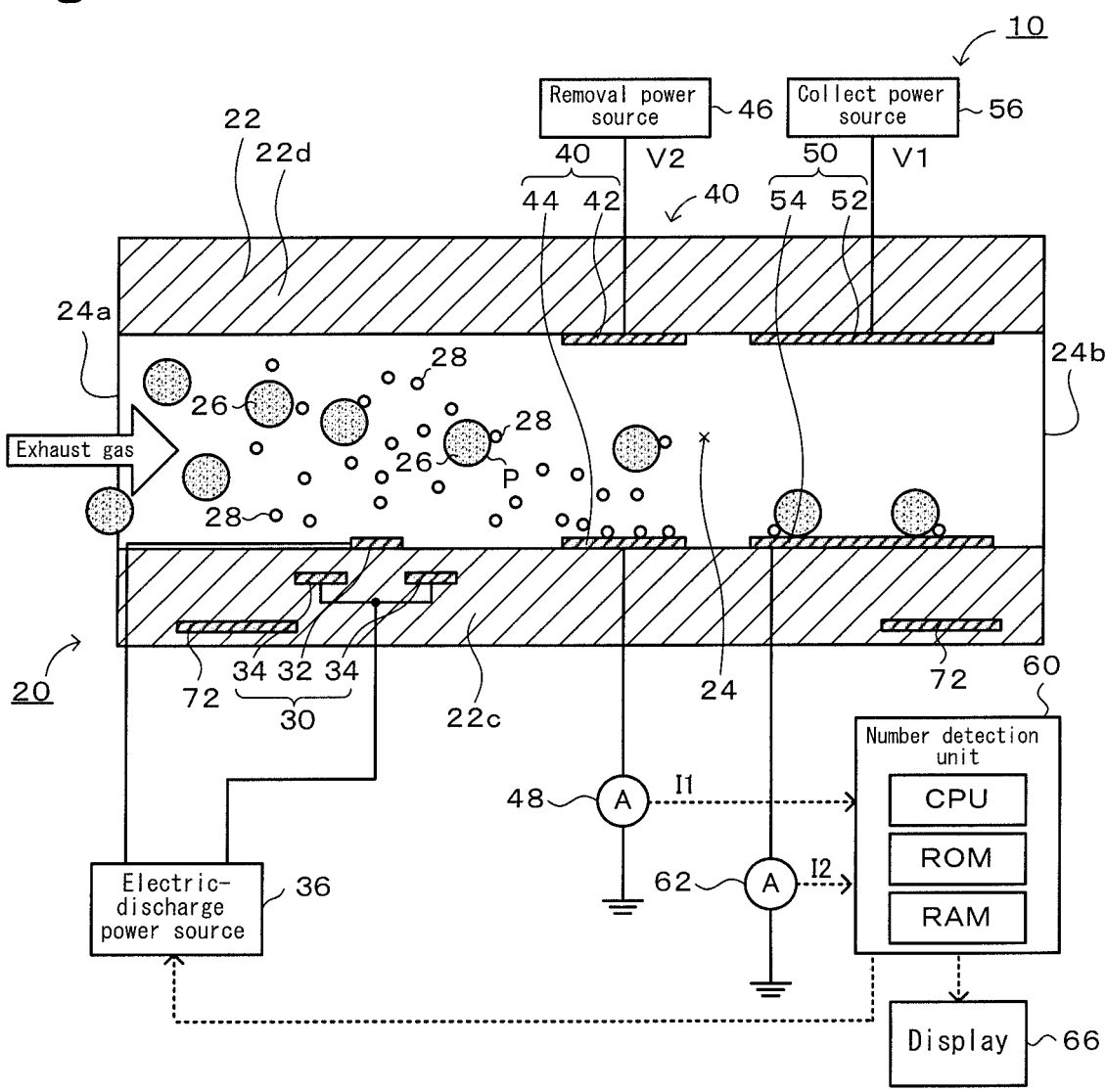
FIG. 4 is a sectional view of FIG. 2 taken along line B-B.

An embodiment of the present invention will now be described with reference to the drawings. FIG. 1 illustrates a particulate detector 10 according to the embodiment of the present invention. FIG. 2 is a perspective view of a particulate detecting element 20. FIG. 3 is a sectional view of FIG. 2 taken along line A-A. FIG. 4 is a sectional view of FIG. 2 taken along line B-B. According to the embodiment, a vertical direction, a left-right direction, and a front-rear direction coincide with those illustrated in FIG. 1 to FIG. 2.

As illustrated in FIG. 1, the particulate detector 10 detects the number of particulates 26 (see FIG. 4) contained in exhaust gas that flows through an exhaust pipe 12 of an engine. The particulate detector 10 includes the particulate detecting element 20 and accessory units 80 including various power sources 36, 46, and 56 and a number detection unit 60.

As illustrated in FIG. 1, the particulate detecting element 20 is inserted in a cylindrical support 14 and attached to a ring-shaped base 16 that is secured to the exhaust pipe 12. The particulate detecting element 20 is protected by a protective cover 18. The protective cover 18 has a hole not illustrated. The exhaust gas that flows through the exhaust pipe 12 passes through the hole and a gas flow path 24 that a lower end portion 22a of the particulate detecting element 20 has. As illustrated in FIG. 4, the particulate detecting element 20 includes an electric-charge generator 30, an excess-electric-charge-removing unit 40, a collector 50, and a heater electrode 72 in a housing 22.

As illustrated in FIG. 1, the housing 22 has a rectangular cuboid shape elongated in a direction intersecting (substantially perpendicular to) the axial direction of the exhaust pipe 12. The housing 22 is an insulator and is composed of, for example, ceramics such as alumina. The lower end portion 22a of the housing 22 is located inside the exhaust pipe 12, and an upper end portion 22b thereof is located outside the exhaust pipe 12. The lower end portion 22a of the housing 22 has the gas flow path 24. Various terminals are disposed on the upper end portion 22b of the housing 22.

The axial direction of the gas flow path 24 coincides with the axial direction of the exhaust pipe 12. As illustrated in FIG. 2, the gas flow path 24 is a space having a rectangular cuboid shape extending from a rectangular gas inlet 24a formed in a front surface of the housing 22 to a rectangular gas outlet 24b formed in a rear surface of the housing 22. The housing 22 includes a pair of left and right flow path walls 22c and 22d that define the gas flow path 24.

As illustrated in FIG. 4, the electric-charge generator 30 is disposed in the flow path wall 22c such that an electric charge is generated near the gas inlet 24a inside the gas flow path 24. The electric-charge generator 30 includes an electric discharge electrode 32 and two ground electrodes 34.

The electric discharge electrode 32 is disposed along the inner surface of the flow path wall 22c and has fine projections around a rectangle as illustrated in FIG. 3. The two ground electrodes 34 are rectangular electrodes and are embedded in the flow path wall 22c so as to be spaced from each other and be parallel to the electric discharge electrode 32. At the electric-charge generator 30, as illustrated in FIG. 4, a pulse voltage of several kV of an electric-discharge power source 36 (one of the accessory units 80) is applied between the electric discharge electrode 32 and the two ground electrodes 34, and consequently, air discharge occurs due to electric potential difference between the electrodes. At this time, a portion of the housing 22 between the electric discharge electrode 32 and the ground electrodes 34 functions as a dielectric layer. The air discharge ionizes gas around the electric discharge electrode 32, and positive electric charges 28 are generated. The electric discharge electrode 32 is connected to a terminal 33 (see FIG. 2) on the upper end portion 22b of the housing 22 with a wiring line, not illustrated, interposed therebetween and is connected to the electric-discharge power source 36 with the terminal 33 interposed therebetween. The two ground electrodes 34 are connected to a terminal 35 (see FIG. 2) on the upper end portion 22b of the housing 22 with a wiring line, not illustrated, interposed therebetween and are connected to the electric-discharge power source 36 with the terminal 35 interposed therebetween.

As illustrated in FIG. 4, the particulates 26 contained in the gas enter the gas flow path 24 from the gas inlet 24a, become charged particulates P when the particulates 26 pass through the electric-charge generator 30 and the electric charges 28 that are generated by the air discharge of the electric-charge generator 30 are applied thereto, and subsequently move backward. Of the electric charges 28 generated, some electric charges that are not applied to the particulates 26 do not change from the electric charges 28 and move backward as it is.

The excess-electric-charge-removing unit 40 corresponds to a first collector and is disposed downstream of the electric-charge generator 30 and upstream of the collector 50 as illustrated in FIG. 4. The excess-electric-charge-removing unit 40 includes an application electrode 42 and a removal electrode 44. The application electrode 42 is disposed along the inner surface of the right flow path wall 22d and is exposed to the inside of the gas flow path 24. The removal electrode 44 is disposed along the inner surface of the left flow path wall 22c and is exposed to the inside of the gas flow path 24. The application electrode 42 and the removal electrode 44 face each other. A removal power source 46 (one of the accessory units 80) applies a voltage V2 (positive potential) smaller than a voltage V1, described later, by about an order of magnitude to the application electrode 42. The removal electrode 44 is connected to the ground with a first ammeter 48 interposed therebetween. The ground may be a frame ground such as the protective cover 18 or the exhaust pipe 12 or may be the earth (the same is true for the following description). Consequently, a weak electric field is generated between the application electrode 42 and the removal electrode 44 of the excess-electric-charge-removing unit 40. Of the electric charges 28 generated by the electric-charge generator 30, excess electric charges 28 that are not applied to the particulates 26 are accordingly attracted to the removal electrode 44 due to the weak electric field, are collected, and are released to the ground. Consequently, the excess-electric-charge-removing unit 40 inhibits the excess electric charges 28 from being collected by a collect electrode 54 of the collector 50 and from being counted as the number of the particulates 26. The application electrode 42 is connected to a terminal 43 (see FIG. 2) on the upper end portion 22b of the housing 22 with a wiring line, not illustrated, interposed therebetween and is connected to the removal power source 46 with the terminal 43 interposed therebetween. The removal electrode 44 is connected to a terminal 45 (see FIG. 2) on the upper end portion 22b of the housing 22 with a wiring line, not illustrated, interposed therebetween and is connected to the first ammeter 48 with the terminal 45 interposed therebetween.

The collector 50 corresponds to a second collector and is disposed on the gas flow path 24 downstream of the electric-charge generator 30 and the excess-electric-charge-removing unit 40 as illustrated in FIG. 4. The collector 50 collects the charged particulates P and includes a facing electrode (electric-field-generating electrode) 52 and the collect electrode 54. The facing electrode 52 is disposed along the inner surface of the right flow path wall 22d and is exposed to the inside of the gas flow path 24. The collect electrode 54 is disposed along the inner surface of the left flow path wall 22c and is exposed to the inside of the gas flow path 24. The facing electrode 52 and the collect electrode 54 face each other. A collect power source 56 (one of the accessory units 80) applies the voltage V1 (positive potential) larger than the voltage V2, which is applied to the application electrode 42, to the facing electrode 52. The collect electrode 54 is connected to the ground with a second ammeter 62 interposed therebetween. Consequently, a relatively strong electric field is generated between the facing electrode 52 and the collect electrode 54 of the collector 50. Accordingly, the charged particulates P that flow along the gas flow path 24 are attracted to the collect electrode 54 due to the relatively strong electric field and are collected. The facing electrode 52 is connected to a terminal 53 (see FIG. 2) on the upper end portion 22b of the housing 22 with a wiring line, not illustrated, interposed therebetween and is connected to the collect power source 56 with the terminal 53 interposed therebetween. The collect electrode 54 is connected to a terminal 55 (see FIG. 2) on the upper end portion 22b of the housing 22 with a wiring line, not illustrated, interposed therebetween and is connected to the second ammeter 62 with the terminal 55 interposed therebetween.

The size of the electrodes 42 and 44 of the excess-electric-charge-removing unit 40, the intensity of the electric field generated between the electrodes 42 and 44, the size of the electrodes 52 and 54 of the collector 50, and the intensity of the electric field generated between the electrodes 52 and 54 are set such that the charged particulates P are not collected by the removal electrode 44 but are collected by the collect electrode 54, and the electric charges 28 that are not applied to the particulates 26 are removed by the removal electrode 44. In general, the electrical mobility of the electric charges 28 is equal to or more than 10 times the electrical mobility of the charged particulates P. The electric field needed to collect the electric charges 28 is smaller than that to collect the charged particulates P by an order of magnitude or more. Accordingly, the above setting can be easily made. A plurality of the facing electrodes 52 and a plurality of the collect electrodes 54 may be provided.

The number detection unit 60 includes a known microcomputer composed of CPU, ROM, RAM, and other components. The number detection unit 60 receives a first electric current I1 from the first ammeter 48 that measures an electric current that flows through the removal electrode 44 and receives a second electric current I2 from the second ammeter 62 that measures an electric current that flows through the collect electrode 54. The number detection unit 60 outputs a control signal for controlling voltage to the electric-discharge power source 36, calculates the number of the particulates in the exhaust gas on the basis of the first and second electric currents I1 and I2, and outputs the result to a display 66.

The heater electrode 72 is a belt-like heating element that is embedded in the housing 22. Specifically, the heater electrode 72 is disposed so as to extend from one of terminals 75 (see FIG. 2) on the upper end portion 22b of the housing 22, be drawn zigzag in the flow path wall 22c of the housing 22, and extend back to the other terminal 75 (see FIG. 2) on the upper end portion 22b of the housing 22. The heater electrode 72 is connected to a power supply device, not illustrated, with a pair of the terminals 75 interposed therebetween and generates heat when energized by the power supply device. The heater electrode 72 heats the housing 22 and the electrodes such as the removal electrode 44 and the collect electrode 54.

An example of use of the particulate detector 10 will now be described. When the particulates 26 contained in exhaust gas of an automobile are measured, the particulate detecting element 20 is installed in the exhaust pipe 12 of the engine as described above (see FIG. 1).

As illustrated in FIG. 4, the particulates 26 contained in the exhaust gas that is introduced into the gas flow path 24 from the gas inlet 24a become the charged particulates P when charged with the electric charges 28 (here, positive electric charges) generated by electric discharge of the electric-charge generator 30. The charged particulates P pass through the excess-electric-charge-removing unit 40, at which the electric field is weak, which includes the removal electrode 44 the length of which is shorter than that of the collect electrode 54, and reach the collector 50. The charged particulates P that reach the collector 50 are collected by the collect electrode 54 by using the electric field that is generated for collection by the facing electrode 52. The second ammeter 62 measures the second electric current I2 based on the electric charges 28 of the charged particulates P that are collected by the collect electrode 54. The electric charges 28 that are not applied to the particulates 26 are attracted to the removal electrode 44 of the excess-electric-charge-removing unit 40 even when the electric field is weak, pass through the first ammeter 48 from the removal electrode 44, and are released to the ground. The first ammeter 48 measures the first electric current I1 based on the electric charges 28 that are collected by the removal electrode 44. The unnecessary electric charges 28 that are not applied to the particulates 26 are removed by the excess-electric-charge-removing unit 40 and scarcely reach the collector 50.

Figure 5:
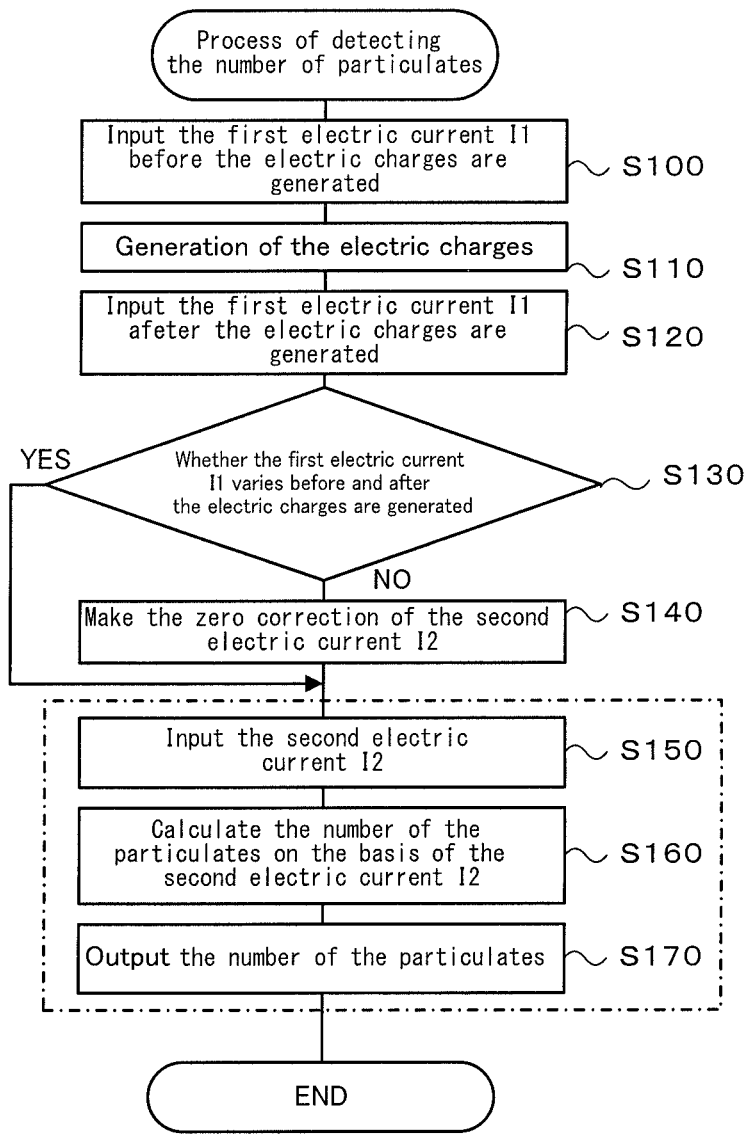
FIG. 5 is a flow chart of a routine of a process of detecting the number of particulates.

The CPU of the number detection unit 60 reads and runs a program, which is stored in the ROM of the number detection unit 60, for a routine of a process of detecting the number of the particulates with predetermined timing of detecting the number of the particulates. FIG. 5 is a flow chart of the routine of the process of detecting the number of the particulates.

The CPU of the number detection unit 60 begins the routine of the process of detecting the number of the particulates with reception of the first electric current I1 that flows through the removal electrode 44 from the first ammeter 48 before the electric-charge generator 30 generates the electric charges, and the electric current I1 is stored in the RAM (step S100). Subsequently, the CPU of the number detection unit 60 causes the electric-charge generator 30 to generate the electric charges (step S110). Specifically, the CPU of the number detection unit 60 causes the electric-discharge power source 36 to apply a pulse voltage of several kV between the electric discharge electrode 32 and the two ground electrodes 34. Consequently, the air discharge occurs due to the electric potential difference between the electrodes. Subsequently, the CPU of the number detection unit 60 receives the first electric current I1 after the electric charges are generated from the first ammeter 48, stores the first electric current I1 in the RAM (step S120), and determines whether the first electric current I1 varies before and after the electric charges are generated (step S130). For example, the CPU of the number detection unit 60 calculates a difference between the first electric current I1 before the electric charges are generated and the first electric current I1 after the electric charges are generated, determines that the first electric current I1 does not vary before and after the electric charges are generated if the difference is zero (also if the difference is a very small value that is regarded as being substantially zero. The same is true for the following description). The CPU of the number detection unit 60 determines that the first electric current I1 varies before and after the electric charges are generated if the difference is not zero. The first electric current I1 after the electric charges are generated is preferably received before a predetermined period elapses from the generation of the electric charges. The predetermined period is a period until the electric charges spread to and reach the removal electrode 44 after the electric-charge generator 30 generates the electric charges when the flow rate of the exhaust gas is zero. The predetermined period is obtained in advance by, for example, an experiment.

The CPU of the number detection unit 60 estimates that the flow rate of the exhaust gas is zero if the first electric current I1 does not vary before and after the electric charges are generated and makes zero correction (correction for setting the second electric current I2 to zero at this time) of the second electric current I2 (step S140). The base line of the second electric current I2 tends to increase gradually over time. The second electric current I2 ought to be zero when the flow rate of the exhaust gas is zero because the charged particulates P are not collected by the collect electrode 54. Accordingly, the zero correction of the second electric current I2 is made when the flow rate of the exhaust gas is estimated to be zero. If the first electric current I1 does not vary before and after the electric charges are generated, the electric charges that are generated by the electric-charge generator 30 do not reach the excess-electric-charge-removing unit 40 due to flow of the exhaust gas, and accordingly, the flow rate of the exhaust gas is estimated to be zero. If the first electric current I1 varies after the step S140 or at the step S130, the CPU of the number detection unit 60 receives the second electric current I2 that flows through the collect electrode 54 from the second ammeter 62 (step S150), calculates the number of the particulates on the basis of the second electric current I2 (step S160), and outputs the number of the particulates to the display 66 (step S170), and this routine is finished.

Procedures for calculating the number of the particulates at the step S160 will now be described. The relationship between the second electric current I2 and the quantity q of electric charge is that $I2=dq/(dt)$ and $q=\int I2 dt$. The CPU of the number detection unit 60 obtains an integrated value (accumulated electric charge amount) by integrating (adding up) the value of the electric current over a certain period of time, obtains the total number (the number of the collected electric charges) of the electric charges by dividing the accumulated electric charge amount by the elementary charge, and determines the number Nt of the particulates 26 that are collected by the collect electrode 54 to be the total number (see the following expression (1)). The CPU of the number detection unit 60 detects the number Nt as the number of the particulates 26 in the exhaust gas. At this time, it is presumed that the average value (average charge number) of the number of the electric charges that are applied to the single particulate 26 is 1.

$$Nt=(\text{accumulated electric charge amount})/(\text{elementary charge}) \qquad (1)$$

As the particulate detecting element 20 is used, and a large number of the particulates 26 and other substances are accumulated on the collect electrode 54, new charged particulates P are not collected by the collect electrode 54 in some cases. For this reason, the collect electrode 54 is heated by the heater electrode 72 when the amount of the accumulation reaches a predetermined amount or periodically so that the accumulation on the collect electrode 54 is heated and burned up to refresh an electrode surface of the collect electrode 54. The heater electrode 72 can also burn up the particulates 26 that adhere to the inner circumferential surface of the housing 22.

In the particulate detector 10 according to the present embodiment described above, the electric-charge generator 30 generates the electric charges 28, and consequently, the particulates 26 in gas that is introduced into the gas flow path 24 become the charged particulates P. The removal electrode 44 collects the excess electric charges that are not applied to the particulates 26. The collect electrode 54 collects the charged particulates P. The number detection unit 60 corrects (zero correction) the second electric current I2 that varies in response to the charged particulates P that are collected by the collect electrode 54 on the basis of the first electric current I1 that varies in response to the excess electric charges that are collected by the removal electrode 44 and detects the number of the particulates on the basis of the corrected second electric current I2. Consequently, the particulate detector 10 itself can correct the number of the particulates without using a signal from the outside (for example, a vehicle controller of an automobile) of the particulate detector 10.

The number detection unit 60 determines whether the first electric current I1 varies before and after the electric-charge generator 30 generates the electric charges and makes the zero correction of the second electric current I2 at this time if the first electric current I1 does not vary. From the fact that the first electric current I1 does not vary before and after the electric charges are generated, it can be presumed that the flow rate is substantially zero. Accordingly, the zero correction of the second electric current I2 can be made while the flow rate is substantially zero.

When the number detection unit 60 determines whether the first electric current I1 varies before and after the electric-charge generator 30 generates the electric charges, the number detection unit 60 compares the first electric current I1 right before the electric-charge generator 30 generates the electric charges with the first electric current I1 before a predetermined period elapses from the generation of the electric charges. The predetermined period is a period until the electric charges spread to and reach the removal electrode 44 after the electric-charge generator 30 generates the electric charges when the flow rate of the exhaust gas is zero. Accordingly, the zero correction of the second electric current I2 can be made with more proper timing.

It goes without saying that the present invention is not limited to the above embodiment and can be carried out with various embodiments within the technical scope of the present invention.

For example, according to the above embodiment, the routine of detecting the number of the particulates illustrated in FIG. 5 is performed. Alternatively, a routine of a process of detecting the number of the particulates illustrated in FIG. 6 may be performed. That is, the CPU of the number detection unit 60 first causes the electric-charge generator 30 to generate the electric charges (step S210) and receives the first electric current I1 after the electric charges are generated from the first ammeter 48 (step S220). At the step S220, the first electric current I1 may be received from the first ammeter 48 before a predetermined period elapses from the generation of the electric charges as in the above embodiment. Subsequently, the CPU of the number detection unit 60 determines whether the first electric current I1 is zero (step S230), presumes that the flow rate of the exhaust gas is zero if the first electric current I1 is zero to make the zero correction of the second electric current I2 (step S240), performs the above processes at the steps S150 to S170 after that, and performs the processes at the steps S150 to S170 as it is if the first electric current I1 is not zero. Here, since there are no electric charges that are to be collected by the removal electrode 44 before the electric charges are generated, it is presumed that the first electric current I1 is zero. Accordingly, in the case where the first electric current I1 is zero at the step S230, it can be said that the first electric current I1 does not vary from zero before and after the electric charges are generated. Also, in the case where the routine of the process of detecting the number of the particulates illustrated in FIG. 6 is performed, the same effects as in the above embodiment can be achieved.

Figure 6:
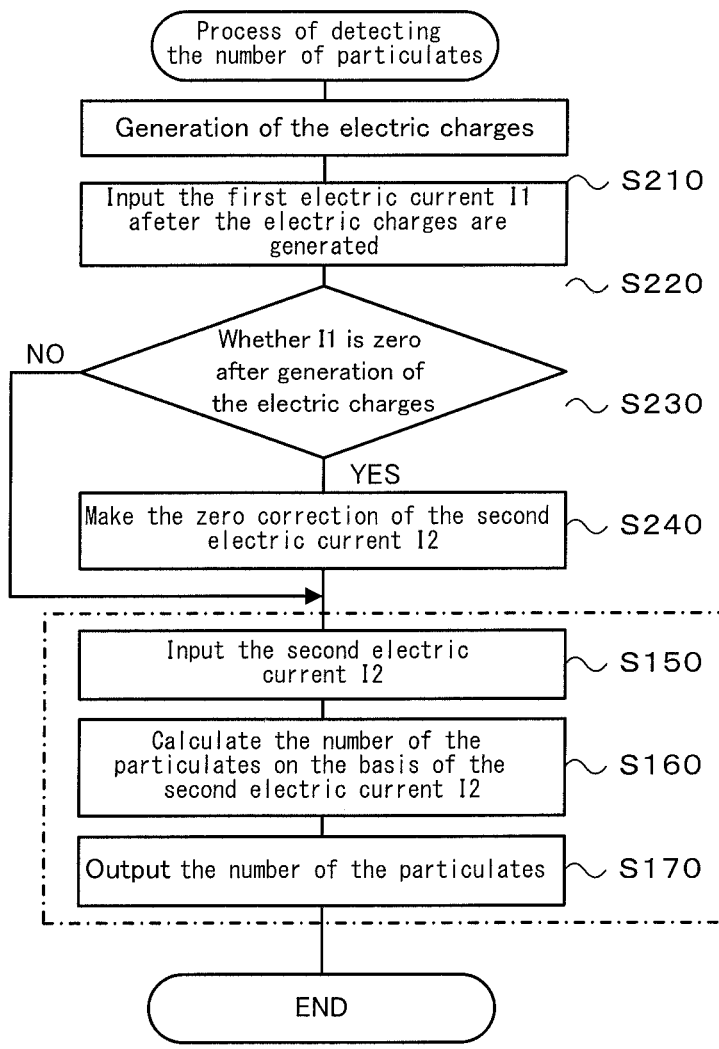
FIG. 6 is a flow chart of another routine of the process of detecting the number of particulates.
Figure 7:
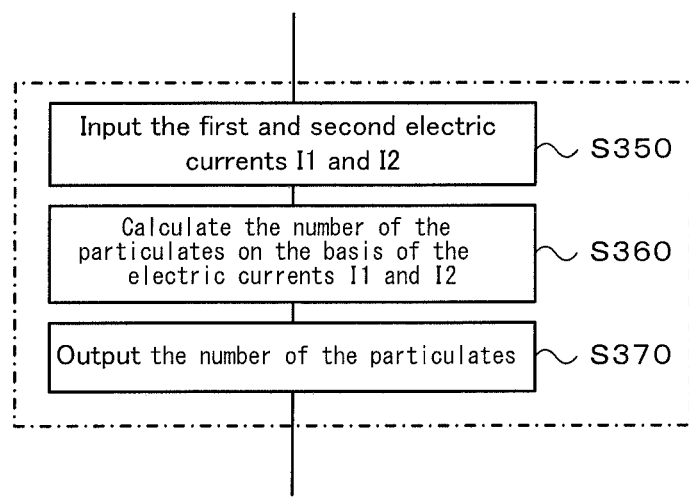
FIG. 7 is a flow chart of steps S350 to 370.

Alternatively, steps S350 to S370 illustrated in FIG. 7 may be performed instead of the steps S150 to S170 (steps surrounded by a one-dot chain line) of the routine of detecting the number of the particulates illustrated in FIG. 5 or FIG. 6. That is, the CPU of the number detection unit 60 receives the first electric current I1 that flows through the removal electrode 44 and the second electric current I2 that flows through the collect electrode 54 (step S350) and calculates the number of the particulates on the basis of the first and second electric currents I1 and I2 (step S360). Specifically, at the step S360, the CPU of the number detection unit 60 obtains the average charge number (the average value of the number of the electric charges that are applied to the single particulate 26) on the basis of the first electric current I1. There is an excessive amount of the electric charges 28 that are generated by the electric-charge generator 30 as compared with the amount of the electric charges 28 that are applied to the particulates 26. For this reason, it is presumed that all of the electric charges 28 that are generated by the electric-charge generator 30 are collected by the removal electrode 44. In this case, the first electric current I1 represents the amount of the electric charges 28 that are generated by the electric-charge generator 30. There is a correlation between the amount of the electric charges 28 that are generated by the electric-charge generator 30 and the average charge number. That is, the larger the amount of the electric charges 28 generated, the larger the average charge number. Accordingly, there is a correlation between the first electric current I1 and the average charge number. The relation between the first electric current I1 and the average charge number can be obtained in advance by, for example, an experiment and is stored in the ROM of the number detection unit 60 or another component. An example of the relation is illustrated in Table 1. The average charge number is obtained from the first electric current I1 by using the relation. Subsequently, the CPU of the number detection unit 60 obtains the corrected second electric current I2c by correcting the second electric current I2 by using the average charge number. Here, the corrected second electric current I2c is a value obtained by dividing the second electric current I2 by the average charge number. An example thereof is illustrated in Table 1. Subsequently, the CPU of the number detection unit 60 obtains the number of the particulates from the above expression (1) by using the corrected second electric current I2c. In this way, the number of the particulates can be obtained with more precision.

TABLE 1

| The first electric current I1 | Average charge number | The corrected second electric current I2c |
|---|---|---|
| 1 | 1.0 | I2 |
| 2 | 1.5 | I2*2/3 |
| 3 | 2.0 | I2*1/2 |
| . | . | . |
| . | . | . |
| . | . | . |

According to the above embodiment, the electric-charge generator 30 includes the electric discharge electrode 32 that is disposed along the inner surface of the gas flow path 24 and the two ground electrodes 34 that are embedded in the housing 22. However, the electric-charge generator 30 may have any structure provided that the electric-charge generator 30 generates the electric charges by air discharge. For example, the ground electrodes 34 are not embedded in the wall of the gas flow path 24 but may be disposed along the inner surface of the gas flow path 24. Alternatively, the electric-charge generator may include a needle-shaped electrode and a facing electrode (see, for example, International Publication No. 2015/146456 pamphlet). According to the above embodiment, the electric-charge generator 30 is disposed in the flow path wall 22c. Alternatively, or in addition to that, the electric-charge generator 30 may be disposed in the flow path wall 22d.

According to the above embodiment, the facing electrode 52 is exposed to the gas flow path 24. However, the facing electrode 52 is not limited thereto and may be embedded in the housing 22. The same is true for the application electrode 42.

In an example described according to the above embodiment, the particulate detector 10 is installed in the exhaust pipe 12 of the engine. However, the exhaust pipe 12 of the engine is not a limitation. Any pipe is acceptable provided that gas containing particulates passes through the pipe.

According to the above embodiment, the particulate detecting element 20 detects the number of the particulates. However, the particulate detecting element 20 may detect the mass or surface area of the particulates. The mass of the particulates can be obtained, for example, by multiplying the number of the particulates by the average mass of the particulates. Alternatively, the relationship between the accumulated electric charge amount and the mass of the particulates collected is stored as a map in a storage device in advance, and the mass of the particulates can be obtained from the accumulated electric charge amount by using the map. The surface area of the particulates can be obtained in the same manner as in the mass of the particulates.

The application claims priority to Japanese Patent Application No. 2018-021334 filed in the Japan Patent Office on Feb. 8, 2018, the entire contents of which are incorporated herein by reference.

What is claimed is:

1. A particulate detector that is used to detect a particulate in gas, the particulate detector comprising:
    a housing having a gas flow path through which the gas passes;
    an electric-charge generator that applies an electric charge generated by electric discharge to the particulate in the gas that is introduced into the gas flow path to obtain a charged particulate;
    a first collector that is disposed on the gas flow path downstream of the electric-charge generator in a direction of flow of the gas and that collects an excess electric charge that is not applied to the particulate;
    a second collector that is disposed on the gas flow path downstream of the first collector in the direction of the flow of the gas and that collects the charged particulate; and
    a detection unit that corrects a second physical quantity that varies in response to the charged particulate collected by the second collector on the basis of a first physical quantity that varies in response to the excess electric charge collected by the first collector and that detects an amount of the particulate on the basis of the corrected second physical quantity.

2. The particulate detector according to claim 1, wherein the detection unit determines whether the first physical quantity varies before and after the electric-charge generator generates the electric charge and makes zero correction of the second physical quantity at this time if the first physical quantity does not vary.

3. The particulate detector according to claim 2, wherein, when the detection unit determines whether the first physical quantity varies before and after the electric-charge generator generates the electric charge, the detection unit compares the first physical quantity right before the electric-charge generator generates the electric charge with the first physical quantity within a period that is predetermined from the time that the electric-charge generator generates the electric charge to the time that the electric charge reaches the first collector when a flow rate of the gas is zero.

4. The particulate detector according to claim 1, wherein the detection unit obtains a charge number per particulate on the basis of the first physical quantity, corrects the second physical quantity by using the charge number, and detects the amount of the particulate on the basis of the corrected second physical quantity.

5. The particulate detector according to claim 2, wherein the detection unit obtains a charge number per particulate on the basis of the first physical quantity, corrects the second physical quantity by using the charge number, and detects the amount of the particulate on the basis of the corrected second physical quantity.

6. The particulate detector according to claim 3, wherein the detection unit obtains a charge number per particulate on the basis of the first physical quantity, corrects the second physical quantity by using the charge number, and detects the amount of the particulate on the basis of the corrected second physical quantity.

7. The particulate detector according to claim 4, wherein, when the detection unit obtains the charge number per particulate on the basis of the first physical quantity, the detection unit uses a relationship between the first physical quantity and the charge number per particulate, the relationship being stored in advance in a memory unit.

8. The particulate detector according to claim 5, wherein, when the detection unit obtains the charge number per particulate on the basis of the first physical quantity, the detection unit uses a relationship between the first physical quantity and the charge number per particulate, the relationship being stored in advance in a memory unit.

9. The particulate detector according to claim 6, wherein, when the detection unit obtains the charge number per particulate on the basis of the first physical quantity, the detection unit uses a relationship between the first physical quantity and the charge number per particulate, the relationship being stored in advance in a memory unit.

* * * * *